(No Model.)
E. WRIGHT.
FASTENING DEVICE.
No. 325,221. Patented Aug. 25, 1885.
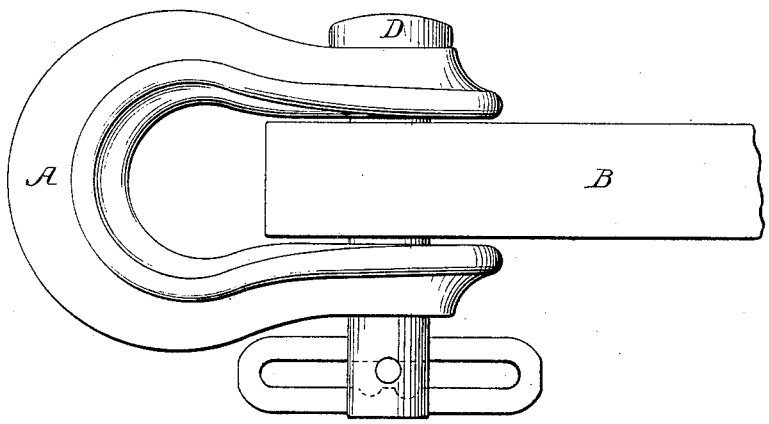
FIG. 1.
FIG. 4.
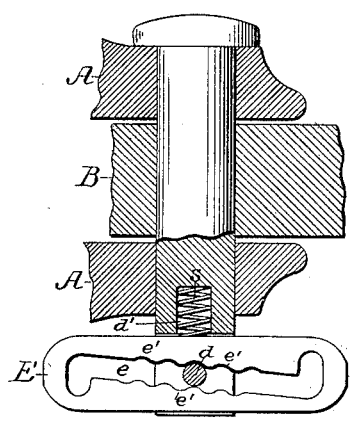
FIG. 2.
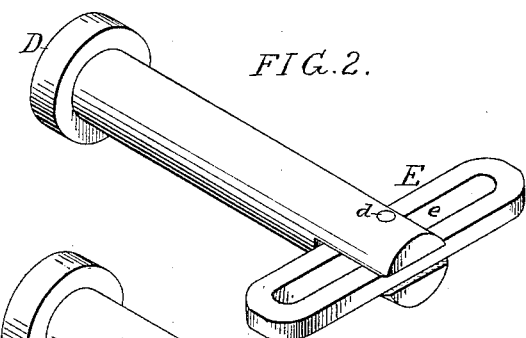
FIG. 3.
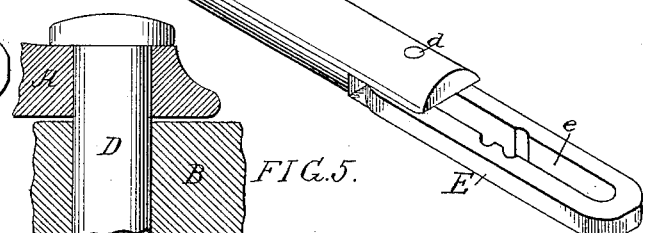
FIG. 7.
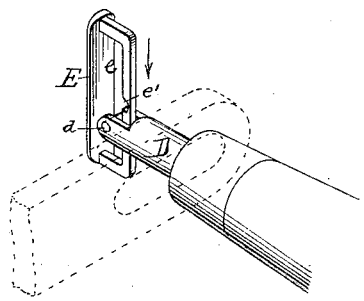
FIG. 5.
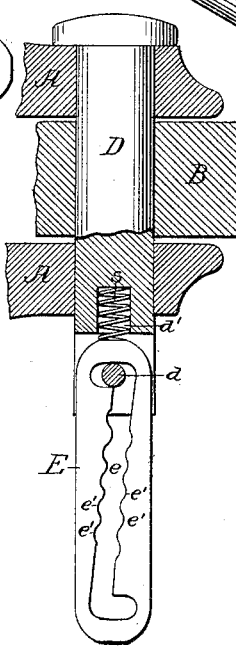
FIG. 6.
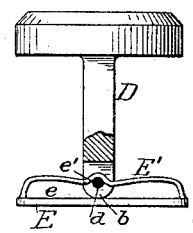
Witnesses
John E. Parker
Henry Bossert
Inventor,
Edwin Wright
by his Attorneys
Howson and Son

UNITED STATES PATENT OFFICE.

EDWIN WRIGHT, OF LEESBURG, VIRGINIA.

FASTENING DEVICE.

SPECIFICATION forming part of Letters Patent No. 325,221, dated August 25, 1885.

Application filed June 1, 1885. (No model.)

*To all whom it may concern:*

Be it known that I, EDWIN WRIGHT, a citizen of the United States, and a resident of Leesburg, Loudoun county, Virginia, have invented a certain Improved Fastening Device, of which the following is a specification.

My invention consists of an improved fastening device more especially adapted for use in connection with thill-couplings, whiffletree-hooks, plow clevises, and similar devices, although my improved fastener may be applied to almost any use in which a stem, bolt, or pin is to be passed through an opening in which it is desired to securely retain it.

In the accompanying drawings, Figure 1 is a side view showing the application of my invention to a plow-clevis. Fig. 2 is a perspective view of the device. Fig. 3 is a perspective view of the bolt with the retainer in a different position. Fig. 4 is a sectional view of a modification. Fig. 5 is a similar view showing the retainer in a different position. Fig. 6 is a view, partly in section, of another modification; and Fig. 7 is a perspective view of my invention as applied to a whiffletree-hook.

In Figs. 1, 4, and 5 my improved fastener is shown as applied to a plow-clevis, B being a portion of a plow-beam, and A the clevis, through which the headed swivel pin or bolt D is passed. The outer end of this pin or bolt is notched or split to receive the slotted retainer-plate E, which is in connection with the pin or bolt D, through the medium of a transverse pin, $d$, passing through the slot $e$ of the retainer-plate. In the body of the pin D is formed a recess, $d'$, opening into the notch in the end of the pin, and adapted to receive a spring, $s$, which bears on the edge of the plate E, and thereby keeps it always in frictional contact with the transverse pin $d$, so as to tend to retain the plate E in any position to which it may be moved. When the pin or bolt D is to be passed through the clevis or other device to be retained, the retainer E is turned into line with the stem of the bolt, so as to form, in fact, a continuation of it, as shown in Fig. 3. After the bolt has been passed through the openings in the clevis or other device, the retainer-plate E is turned at right angles thereto, and preferably moved laterally until the pin $d$ shall occupy a position near the center of the plate E, the latter consequently extending equally on both sides of the stem of the bolt to retain the bolt and prevent its withdrawal until the retainer-plate shall have been turned back again into line with the stem of the bolt.

In order to facilitate the retention of the plate E in a position at right angles to the stem of the bolt, I form in one or both edges of the slot $e$ of the plate a notch or notches, $e'$, into which the pin $d$ will fall under the action of the spring $s$, and prevent the lateral movement of the plate E.

In the construction shown in Figs. 1, 2, and 3 the slot in the plate E is formed parallel with the outer edges of the plate; but, if desired, the slot $e$ may be made at an angle, as shown in the modification, Figs. 4 and 5, so as to have a wedging action on the bolt or stem D against the device in which it is held; but in this case, also, I prefer to form notches or recesses $e'$ in the edge of the slot, and at the ends of the plate the slot is enlarged, as shown in the drawings, in order to permit the free turning of the plate preparatory to moving it in either direction.

Instead of forming the friction-spring $s$ separately from the plate E, it may be formed as a part thereof, as shown in the modification, Fig. 6, in which I have illustrated my invention as applied to a stud for personal wear.

In this case D is the stem of the stud, notched at its outer end and provided with a transverse pin, $d$, as in the construction before described, while E is the retainer-plate, having a slot, $e$, formed by means of a spring-loop, E', which is also bent to form a notch, $e'$. The arm E', which constitutes the spring in this case, presses against the pin $d$, so as to bring the plate up into contact with the end of the stem $b$, and tend to prevent lateral movement of the plate E. With the exertion of a little pressure, however, the retainer-plate E can be moved so as to bring the pin $d$ into the end of the slot, and then turn the plate E into line with the stem D, to pass through the button-hole of a cuff or shirt. The retainer-plate can then be restored to its normal position shown in the drawings.

In Fig. 7 I have shown my invention as applied to a whiffletree-hook, the retainer-plate in this case having one edge widened to prevent the presentation of projecting shoulders by the end of the stem when the plate is turned into line with the stem to push it through the trace.

I claim as my invention—

1. A fastener consisting of a stem or bolt, carrying at its end a slotted retaining-plate and a friction-spring bearing against the edge of the retaining-plate, substantially as set forth.

2. A fastening consisting of a friction-spring, a bolt or stem having a transverse pin, $d$, and a slotted retainer-plate, through which said pin passes, the slot having a notch or notches in its edge, substantially as set forth.

3. A fastening consisting of a stem or bolt having a transverse pin, $d$, with a retaining-plate having an inclined slot through which the said pin passes, and a friction-spring bearing against the edge of the plate, substantially as set forth.

In testimony whereof I have signed my name to this specification in the presence of two subscribing witnesses.

EDWIN WRIGHT.

Witnesses:
A. DIBRELL,
EDGAR LITTLETON.